United States Patent
Moorehead et al.

(10) Patent No.: US 6,773,603 B2
(45) Date of Patent: Aug. 10, 2004

(54) CHEMICAL REMOVAL AND SUSPENDED SOLIDS SEPARATION PRE-TREATMENT SYSTEM

(75) Inventors: Jack Moorehead, San Diego, CA (US); Joseph T. Lodico, San Diego, CA (US)

(73) Assignee: Intellectual Capital Enterprises, Inc., Las Vegas, NV (US)

(*) Notice: Subject to any disclaimer, the term of this patent is extended or adjusted under 35 U.S.C. 154(b) by 21 days.

(21) Appl. No.: 09/732,164

(22) Filed: Dec. 7, 2000

(65) Prior Publication Data

US 2001/0020603 A1 Sep. 13, 2001

Related U.S. Application Data

(63) Continuation-in-part of application No. 09/524,578, filed on Mar. 13, 2000, now Pat. No. 6,332,980.

(51) Int. Cl.[7] .................................................. C02F 1/24
(52) U.S. Cl. ........................ 210/704; 210/706; 210/712; 210/718; 210/721; 210/738; 210/760
(58) Field of Search ................................. 210/703, 704, 210/706, 712, 718, 721, 738, 750, 760, 765, 787, 788, 188

(56) References Cited

U.S. PATENT DOCUMENTS

| | | | | |
|---|---|---|---|---|
| 3,966,598 A | * | 6/1976 | Ettelt .......................... 210/104 |
| 4,094,783 A | * | 6/1978 | Jackson ........................ 210/197 |
| 4,156,648 A | | 5/1979 | Kuepper ....................... 210/44 |
| 4,335,994 A | | 6/1982 | Gurth .......................... 415/90 |
| 4,414,112 A | | 11/1983 | Simpson et al. .......... 210/512.1 |
| 4,681,682 A | | 7/1987 | White et al. .............. 210/221.2 |
| 4,683,122 A | | 7/1987 | Concordia et al. .......... 422/227 |
| 5,028,318 A | | 7/1991 | Aslin ........................... 210/85 |
| 5,100,552 A | | 3/1992 | Carroll .................... 210/512.1 |
| 5,322,169 A | * | 6/1994 | Tils ............................. 209/170 |
| 5,338,341 A | | 8/1994 | Mazzei et al. ................ 96/208 |
| 5,401,397 A | | 3/1995 | Moorehead .................. 210/108 |
| 5,494,589 A | * | 2/1996 | Moorehead et al. ...... 210/198.1 |
| 5,616,250 A | * | 4/1997 | Johnson et al. ............. 204/557 |
| 5,622,545 A | | 4/1997 | Mazzei et al. ................ 96/210 |
| 5,736,059 A | * | 4/1998 | Mackelvie ................... 165/47 |
| 6,277,288 B1 | * | 8/2001 | Gargas ....................... 205/752 |
| 6,332,980 B1 | * | 12/2001 | Moorehead ................. 210/104 |

* cited by examiner

Primary Examiner—Peter A. Hruskoci
(74) Attorney, Agent, or Firm—Thomas E. Coverstone; Townsend & Townsend & Crew LLP (57) ABSTRACT

A pre-filtration apparatus and system using dissolved oxygen ozone-treated water processed through an oxygen saturator having a flow distributor for even distribution of the water. Fully saturating the water with excess oxygen and injecting this high-pressure mixture into a blender have a lower pressure atmosphere to produce a plurality of microbubbles known as white-water. Influent water enter the blender through nozzles aligned with the injection of the high-pressure water to blend with the white-water. The blend passes into a hydrocyclone separator from the bottom, spirals up separating waste water from the clean water. Clean water is discharged; waste water is passed to a recovery unit for further processing and recycled. Volatile gas from dissolved toxic chemicals adsorbed by the microbubbles is discharged through a carbon filter recovery process.

25 Claims, 6 Drawing Sheets

CHEMICAL REMOVAL AND SUSPENDED SOLIDS SEPARATION PRE-TREATMENT SYSTEM

CROSS REFERENCES TO RELATED APPLICATIONS

This application is a continuation-in-part to an application filed on Mar. 13, 2000, application Ser. No. 09/524,578 now U.S. Pat. No. 6,332,980.

STATEMENT REGARDING FEDERALLY-SPONSORED RESEARCH OR DEVELOPMENT

Not applicable.

FIELD OF THE INVENTION

This invention relates in general to systems for removing contaminants from liquids and, more specifically to a system for removing toxic chemicals and volatile gases (such as methyl tertiary butyl ether [MTBE], benzene, trihalomethanes, and the like), volatile chemical contaminants, pesticides, particles such as algae, other suspended organic and inorganic solids, chemicals, dissolved oils, and other particles including large and heavy particles and light, fine, or buoyant particles from water.

BACKGROUND OF THE INVENTION

This present invention relates to an improvement in a pretreatment filtration system which removes most contaminants from raw influent water before the water to be processed enters the treatment plant filtration system.

Proper water treatment and filtration are major concerns for the health and safety of all inhabitants where ever located. Improper treatment and/or disposal causes health problems, disease, and even death. The Center for Disease Control (CDC), through DNA tests, identified human sewage as the source of the 1993 Milwaukee, Wis., Cryptosporidium parvum parasite outbreak that infected over 400,000 people in that city. In the latest issue of the CDC's, Emerging Infectious Diseases Journal, the results are reported on the molecular analysis of 39 isolates of Cryptosporidium parvum from human and bovine sources in nine human outbreaks, including isolates from the 1993 Milwaukee outbreak. The new study suggests that the source of the parasite Cryptosporidium parvum in the Milwaukee outbreak is human, not bovine.

Four stool specimens were examined from the Milwaukee outbreak: three from the original outbreak and a fourth from an AIDS patient in 1996 who had initially been infected in the 1993 outbreak. All four were found only in isolates from humans. None of the four isolates were capable of producing an infection in laboratory animals.

Animal waste was also identified by DNA tests as the source of the Canadian E. coli outbreak that infected over 2,000 people in Walkerton, Ontario, following a summer rainstorm in May 2000. A deadly strain of E. coli bacteria was distributed by the Walkerton, Ontario public water supply in May, killing six people and infecting 2,000 others. New Canadian regulations were passed forcing municipalities to ensure the water is safe and to thereby prevent any recurrence.

Canadian municipalities must release their first public water quality reports by Oct. 30, 2000. Municipalities that violate the rules face fines ranging from $20,000 to $2 million. Jail sentences can also be imposed. This new regulation establishes tougher drinking water standards and policies that reflect the most current expertise and procedures in drinking water protection. Additionally, the U.S. Consumer Confidence Report requires every public water utility to distribute a detailed analysis of the chemicals, parasites, bacteria and virus in their public water supply for the previous year to all homeowners. These water quality reports are increasing the demand for better technology that works.

All public water districts using surface water must install filtration equipment and hire a State certified grade-3 plant operator by the year 2003, which is the Clean Water Act regulations deadline for small water districts. The largest immediate market for pre-filtration systems are in those states with the highest number of small water districts using surface water. Efficient and effective pre-filtration systems are a mandated necessity under current regulations/requirements. The pre-filtration system of the present invention meets, and exceeds, the challenges imposed by these regulations/requirements and far surpasses current pre-filtration systems in that challenge.

Water supplies for domestic drinking water, process water for chemical plants, or other liquids are often contaminated with a variety of contaminants, such as, but not limited to, toxic chemicals, volatile chemical contaminants (such as MTBE, benzene, perchlorate, trihalomethanes, and the like), pesticides, particles such as algae, other suspended organic and inorganic solids, dissolved oils, and other particles including large and heavy particles and light, fine, or buoyant particles (referred to collectively as contaminants). These contaminants must be removed in a reliable and cost-effective, cost-efficient manner.

The pre-filtration water decontamination system of the present invention was designed to remove most of the organic suspended solids (such as, but not limited to, algae), and volatile toxic chemicals from the raw influent water before it enters a final-stage treatment plant filtration system. Pre-filtration is necessary for a more efficient operation of the final-stage filtration. Common pre-filtration systems include use of sand filters, membrane filters, chemical flocculation-sedimentation-filtration (settle-to-the-bottom method), and large tank-type dissolved air flotation (DAF) systems. These systems and methods do work at pre-filtration but are not as effective nor as efficient as is necessary for proper pre-filtration.

Many older water treatment plants use gravitational separation methods, typically in sedimentation systems or dual-media sand filtration systems that may not be acceptable under the newer water quality standards. In some cases, these systems can meet the standards through the use of properly mixed polymer chemical filter aids. The required expensive and complex polymer chemical mixing equipment requires constant attention, since the amount of the chemicals being added to raw water must be frequently readjusted to match the continually changing chemistry of the water being filtered. Slow sand filters require a considerable investment, but generally can be operate for longer periods without cleaning. Unfortunately, even with pretreatment, both dual-media and slow sand filters fail to meet water quality standards for hours or several days after each backwash cleaning. Ordinary sand filters become overwhelmed after every rainstorm. Membrane filters, which generally are more efficient than sand filters, quickly clog and require constant attention whenever it rains. The system of the present invention actually becomes more efficient when turbidity increases.

Ordinary chemical flocculation and sedimentation processes are slow, require chemicals, and their maintenance is high. Moreover, they do not prevent toxic chemicals, pesticides and algae from passing through the ordinary filter bed. If algae spores, for example, are present when chlorine is added, toxic disinfection byproducts are formed, which is highly undesirable and a violation of the USEPA Safe Drinking Water Act. The inability of older municipal filtrations systems to remove algae is apparent in the lack of clarity found when a swimming pool is filled with "clean" tap water. Most pool contractors have to shock tap water with large doses of chlorine chemical pool oxidizer to achieve the desired clear pool water appearance.

Some decontaminating systems, such as air stripping towers, currently discharge toxic chemical gases and volatile organic compounds into the atmosphere. Particulate material has also been removed from liquids by DAF floatation, another gravitational method, in which bubbles of a gas, such as air or oxygen, are introduced into the lower levels of the liquid and float to the top, carrying fine particles with them. These systems rely heavily on chemicals whereby chemical flocculates and microscopic air bubbles slowly float to the surface of a large flotation tank. This system is very costly and cumbersome requiring chemical mixers to blend flocculating chemicals such as alum (aluminum) with the raw influent before it enters a main tank. A large impeller pump injects high-pressure water containing excess dissolved air through an array of jet nozzles in the bottom of the tank. Mechanical scrapers push the float particles into a trough for removal and dewatering. These are relatively inefficient, in light of the outbreaks above-described, costly to operate and maintain, and require proper treatment and/or dispose of chemical residues and by-products.

Flotation is a gravitational method because the rise of bubbles is due to the gravitational acceleration acting on the mass of the liquid in accordance with the basic force equals mass time acceleration relationship. A force balance relative to a pocket of gas phase within liquid (a bubble), where the mass of the bubble is its volume times its density, shows that the bubble must rise to find equilibrium, because the density of a gas is generally less than that of a liquid. Large flotation tanks are required to allow adequate time for air bubbles to reach the surface.

Failure to remove all contaminants prior to filtration also leads to clogged filters, increases filter operation costs and wastes water required for frequent filter cleaning cycles. The use of flocculation promoting chemicals increases the volume of sludge to be dewatered and removed.

Thus, there is a continuing need for a pre-filtration (or pretreatment) separation system that will rapidly, efficiently, and effectively remove particles and volatile gases from liquids while treating a liquid, will efficiently remove algae and volatile gases (all contaminants) during pretreatment prior to filtration and will reduce overall treatment costs and conserves water through less frequent filter cleaning and a smaller sludge volume.

The present invention uses micro-bubbles with ionized ordinary ambient air (to form micro-bubbles) which basically blend with raw process water (raw influent). These micro-bubbles attach to suspended particles (contaminants) of the raw influent and are quickly removed from the water stream with a hydrocyclone vortex extraction column (separator). This extraction method is simple and environmentally friendly. No aluminum chemicals are used, which as a result reduces the volume of sludge to be disposed of in landfills. By simply removing most of the contaminants from the process water stream, the present invention prevents the formation of toxic chemical byproducts when necessary chlorine residuals are added to prevent bacterial regrowth in the community distribution system.

After removal of the contaminants, decontaminated water (which has been separated from the raw influent) is discharged to the filtration system and the waste water is discharged to a recovery system for recovery and removal of disposable and/or any recyclable waste (sludge) and re-processing of remaining waste water back through the system. This pre-filtration system was designed to remove contaminants from raw influent before it enters the treatment plant filtration system. It is simple, efficient, effective, low in maintenance, and environmentally friendly. No chemicals are used, which thereby reduces the volume of sludge to be disposed of in landfills. Removing most of the contaminants from the raw influent prevents the formation of toxic chemical disinfection byproducts, formed when chlorine chemical residuals are added to other systems to prevent bacterial re-growth in community water distribution systems.

Accordingly, several objects and advantages of my invention are to:
 a. establish a pre-filtration system which is low in cost, easy to install, and easy to maintain;
 b. provide a pre-filtration system which is relatively compact in size;
 c. dramatically reduced replacement costs for a pre-filtration system;
 d. provide for a pre-filtration system which is extremely efficient in separating waste matter, solids and gases, from an influent stream;
 e. to minimize or eliminate the use of chemicals and toxins in a pre-filtration system; and
 f. more safely and effectively pre-treat influent.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a pre-filtration water decontamination apparatus having an oxygen saturator for introducing high-pressure air and a high-pressure ozone-treated ionized water mixture therein and to substantially saturate this high-pressure treated/ionized water mixture with excess oxygen thereby creating a high-pressure oxygenated mixture (HPOM) stream; a blender for receiving and mixing the HPOM stream from the oxygen saturator with influent water containing contaminants to be removed; means for directing the HPOM stream from the oxygen saturator, at a predetermined pressure, to the blender, and means for directing influent water to the blender at a lower pressure such that a white-water process (WWP) stream comprising a plurality of micro-bubbles is created in the blender; a separator for receiving the WWP stream from the blender and having means for causing upward vortex rotation of the WWP stream, for separating from the WWP stream a waste water stream along a central axis of the upward vortex of the separator, and for separating from the WWP stream a decontaminated water (DCW) stream along an outer wall of the separator; and a recovery unit for directing discharge of the DCW stream out of the apparatus through a water outlet, and for directing disposition of the waste water stream out of the apparatus for re-processing and for recycling.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

Details of the invention, and of preferred embodiments thereof, will be further understood upon reference to the drawings, wherein.

DETAILED DESCRIPTION OF THE INVENTION

Figure 1A:
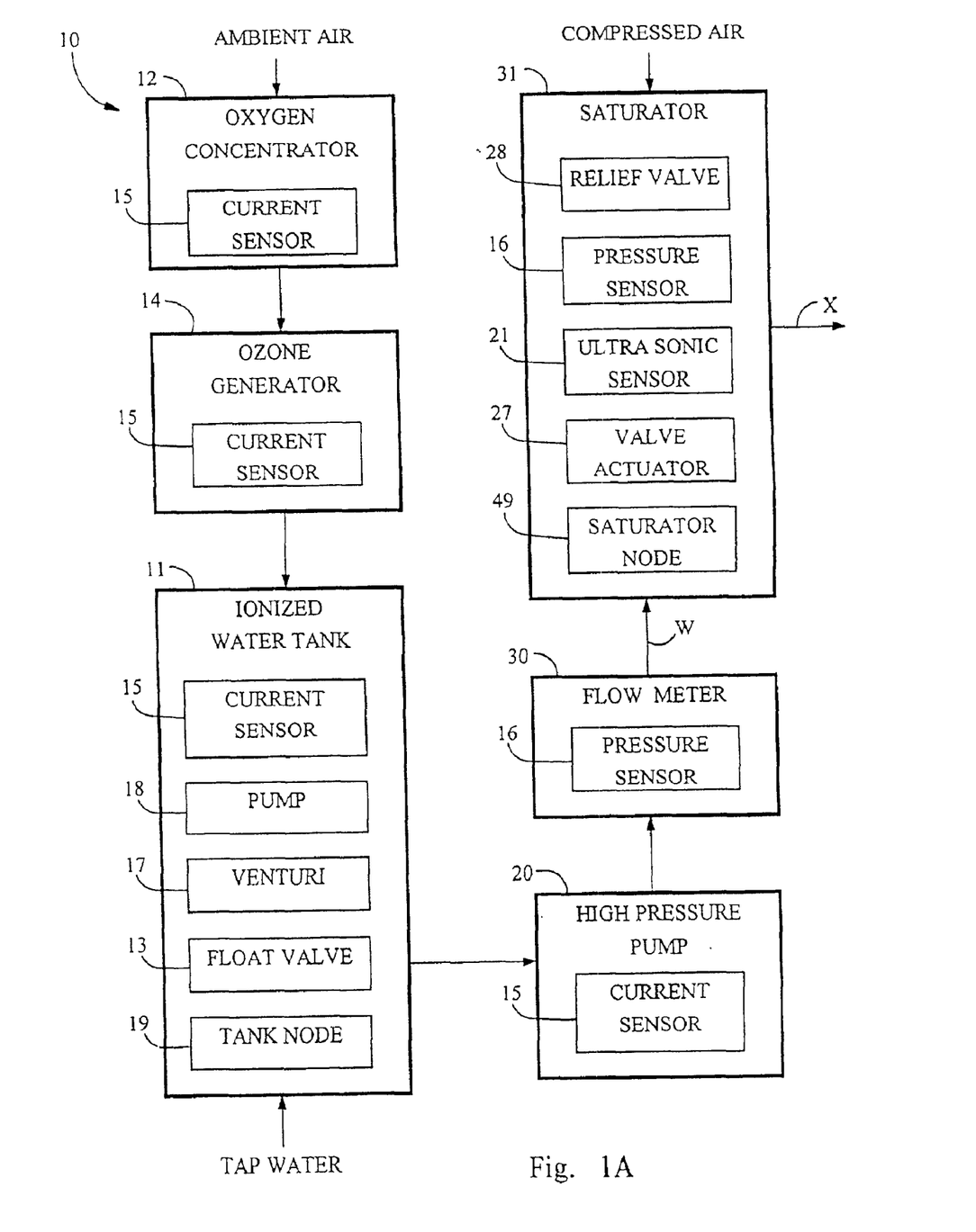
FIGS. 1A and 1B represent a flow chart of the pre-filtration decontamination system.
Figure 1B:
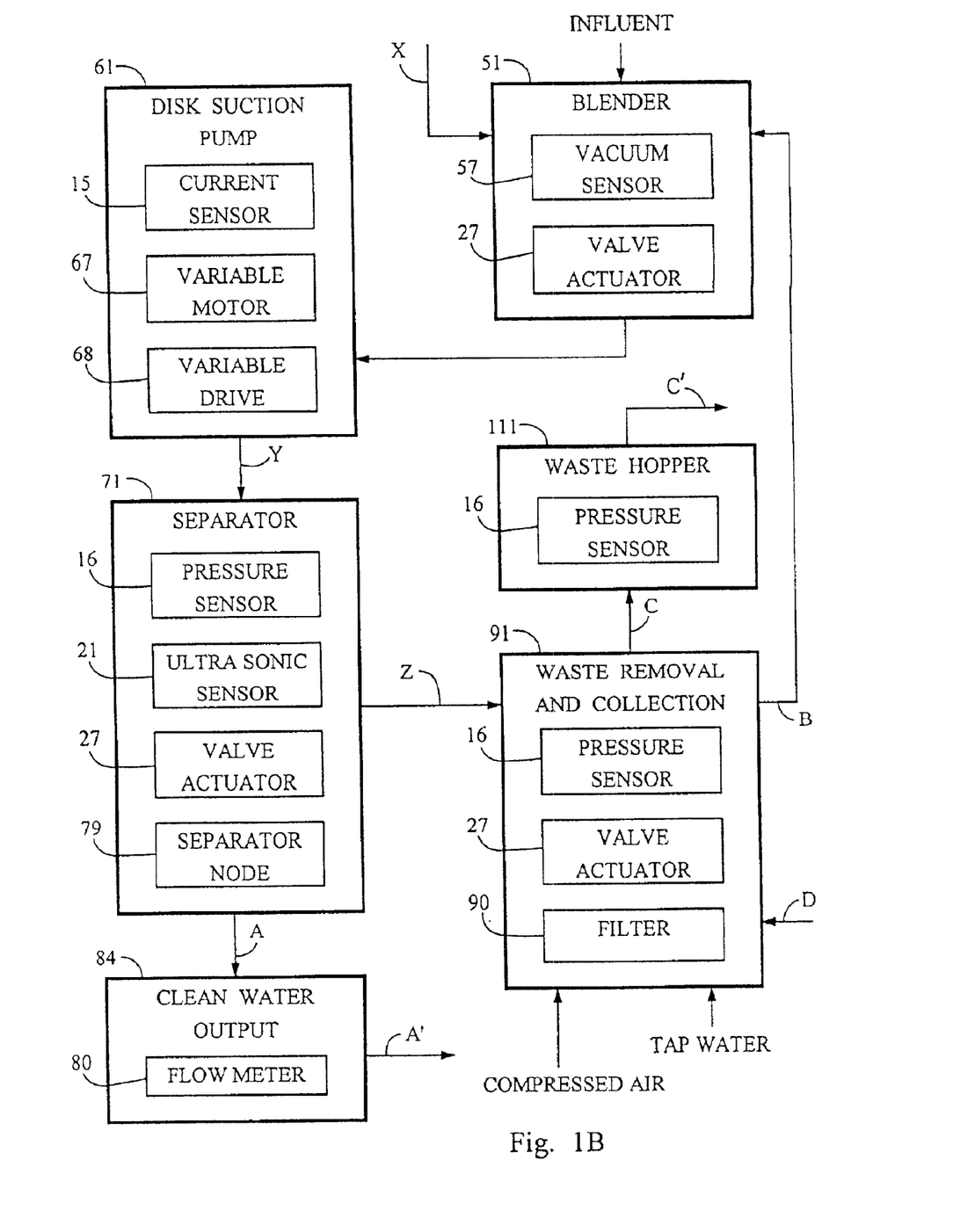

A flow chart for the pre-filtration water decontamination system of this invention is provided in FIGS. 1A and 1B. Ambient air enters a conventional oxygen concentrator and air dryer 12 where oxygen is concentrated from, for example, a resin nitrogen chemical adsorption process. A typical oxygen concentrator, or its equivalent, is Model/Part Number PPTitan/16 distributed by Ozotech, Inc., of Yreka, Calif. The oxygen concentrator 12 increases the proportion of oxygen in the air to about 60 to 96 percent.

Next the concentrated oxygen enters a conventional corona discharge type ozone generator 14 where a suitable percentage of the oxygen is converted to ozone. A typical such generator, or its equivalent, is Model/Part Number OZ2BTU distributed by Ozotech, Inc., of Yreka, Calif. The resulting oxygen-ozone gas mixture is drawn into a water tank 11 by a venturi 17 where it is dissolved and blended with clean water from the water tank 11 through the venture 17 by a pump 18 (a conventional impeller pump for example). The water, with dissolved ozone, in the water tank 11 is now ionized or positively charged. It receives 'clean' water (also referred to as re-circulated water or tap water; i.e., already processed through a full filtration system). The water tank 11 has a conventional level sensor or float valve 13 to detect the level of water therein and to cause the water tank 11 to be refilled as needed. A conventional ozone sensor in the water tank 11 monitors the ozone concentrations therein.

A conventional hi-pressure pump 20 draws the ionized, ozone-treated water from the water tank 11 and, at high pressure, injects it into an oxygen saturator 31. A conventional solenoid-actuated air valve 27 adds additional air when the air envelope inside the oxygen saturator 31 shrinks as it is being adsorbed. Output is measured by the flow meter 30. The preferred pressure is between about 80 psi and 150 psi with 120 psi being optimal. An air relief valve 28 dispels excessive pressure build-up to prevent damage to the oxygen saturator 31. The oxygen saturator 31 cause the high-pressure air to create a high-pressure mixture which flows through the oxygen saturator 31 whereby excess dissolved oxygen, nitrogen, and other gases present in the ambient air from the air compressor are adsorbed. The resulting water stream is referred to herein as a high-pressure oxygenated water mixture (HPOM) stream.

Figure 6:
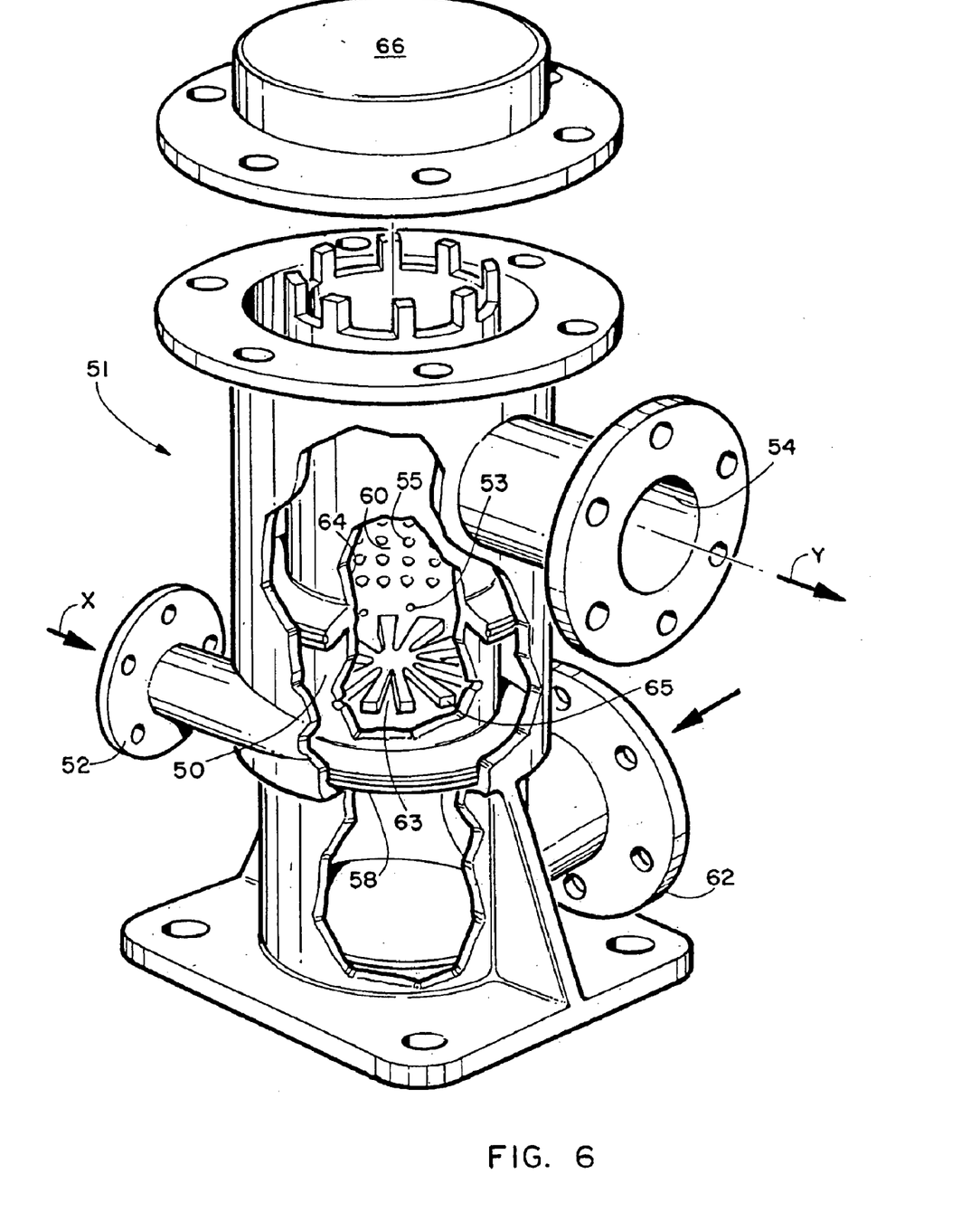
FIG. 6 is an exploded perspective view of the blender.

The HPOM (designated by flow arrow X in FIG. 1B) is discharged and drawn into a blender 51 at between about 80–150 psi; with 120 psi being optimal where it is blended (mixed with) incoming raw influent. Raw influent is drawn into the blender 51 at a pressure significantly less than the pressure of the NPOM by a conventional disk suction pump 61. The preferred pressure is zero to negative for the raw influent; with negative pressure being optimal. When the HPOM comes into contact with the lower pressure/negative pressure created by the drawing-in of the raw influent, because of the significant degree of pressure difference, the HPOM stream turns to white-water (countless numbers of dense, opaque micro-bubbles) and immediately blends or broadcasts into the raw influent. The white-water is injected through the jet inlets or nozzles 53 around the perimeter of the inner wall 64 of the mixing chamber 60 to thereby blend with the raw influent stream as shown in FIG. 6. The ionized white-water micro-bubbles blend with the negatively-charged organic contaminants to form large buoyant clusters of micro-bubble-coated organic particles. The resulting stream herein (consisting of the HPOM white-water and raw influent) is referred to as a white-water process (WWP) stream.

The WWP stream is discharged (as designated by flow arrow Y in FIG. 1B and in FIG. 7), via a tangential port 72, into the base of a hydrocyclone separator or separator where, because of the centrifugal rotation create an upward vortex column therein with high-pressure at the outer perimeter of the separator and lower pressures at the center of the vortex column. The divergent pressures of the WWP stream causes waste, which is covered with micro-bubbles, to separate from the WWP stream and further coalesce at the center (referred to as the waste water stream) and, thereby, causes clean or decontaminated water to separate from the remaining WWP stream at the high pressure perimeter (the decontaminated water is referred to as the DCW stream). The DCW stream is relatively clear and the waste water stream bears the color characteristics of the waste contaminants therein. Heavy and/or larger contaminants may be deposited into a sump 73 at the bottom of the separator and are drained therefrom at the drain port 74.

At the top of the separator 71 a waste outlet discharges the waste water stream (as designated by flow arrow Z in FIG. 1B) and a water outlet, below the waste outlet, discharges the DCW stream (as designated by flow arrow A in FIG. 1B) as the clean water output 84. The DCW stream is monitored and regulated by a flow meter 80. The DCW is then conveyed to the main filtration system (as designated by flow arrow A' in FIG. 1B). The waste water stream collects at, and is further processed in, the waste removal and collection unit 91 (or recovery unit). Here, recyclable waste or sludge is captured in a waste filter 90 and, after the filter is partially full or completely full, the collected waste is dispensed to a waste hopper 111 or equivalent collection unit (as designated by flow arrow C in FIG. 1B) for further disposition and/or recycling after collection of a predetermined quantity (as designated by flow arrow C' in FIG. 1B). Waste water processed through the recovery unit 91 is returned to the blender 51 for further processing (as designated by flow arrow B in FIG. 1B).

The entire system is programmed with conventional software and monitored and controlled by one or more nodes (tank node 19, saturator node 49, and separator node 79 as illustrated in FIGS. 1A & B) for proper pressures (by conventional pressure sensors 16 where needed as illustrated in FIGS. 1A & B), for proper electrical current (by conventional current sensors 15 where needed as illustrated in FIGS. 1A & B) necessary to activate, as needed, the various pumps (ionized water tank pump 18, high pressure pump 20, disk suction pump 61), stream flow (flow meter 30 for the high-pressure pump 20, flow meter 80 for the clean water flow), the various valves (for the oxygen saturator 31, the blender 51, the separator 71, and the waste removal and collection system [recovery unit] 91 to receive or to discharge a respective stream and or build-up of gases or pressure), motors 67 and drives 68, level sensors 21.

Typical products, or their equivalent, include for the nodes, Model/Part Number EC230 distributed by CNA Engineers, Singapore; for the pressure sensors, Model/Part Number MSP600250-P-5-D-4 distributed by Measurement Specialities, Inc., of Valley Forge, Pa.; for current sensors, Model/Part Number HA 10-NP, LTS 25-NP, HY 50-P, or HAL 50-S distributed by LEM USA, Inc., of Milwaukee, Wis.; for the high-pressure pump, Model/Part Number 10 GBC20 distributed by Barrett Pump of San Diego, Calif.; for the air compressor, Model/Part Number Emgio 283MK 15A8P distributed by White Cap of San Diego, Calif.; for the flow meters, Model/Part Number V2-M1A300F300-E3-X1-25 or V2-M1-A100F50-E3-X1-25 distributed by Asahi-America of Malden, Mass.; for the valves, Model/Part Number 509F distributed by Inline Industries; and for the valve actuators, Model/Part Number 509-20S8-3LA-TRIM-01 distributed by Bettis Actuators and Controls.

The entire process is controlled by a conventional communication hardware and software. The protocol used in the present invention is an Echelon LonWorks® digital network; though any equivalent communication hardware and software suited for the intended purpose will suffice. The control software programs are distributed among the various control nodes 19, 49, 79 which monitor and control specific treatment processes within this pre-filtration decontamination system. All actions, such as but not limited to, actuating valving, monitoring and altering pressures, monitoring and altering electric current, starting and stopping the various pumps, monitoring the various air envelopes and water levels, starting and stopping the various motors, and starting and stopping the various compressors, are controlled by these nodes and the respective hardware and software interfacing with and connected to the decontamination system. These monitoring and control equipment and components work together intelligently on a single LonWorks® digital network and can be monitored, controlled, and managed over the Internet. The system of the present invention may be turned on/off automatically by the software; may be turned on/off automatically independent of the software; or may be turned on/off manually; or any combination thereof.

Figure 2:
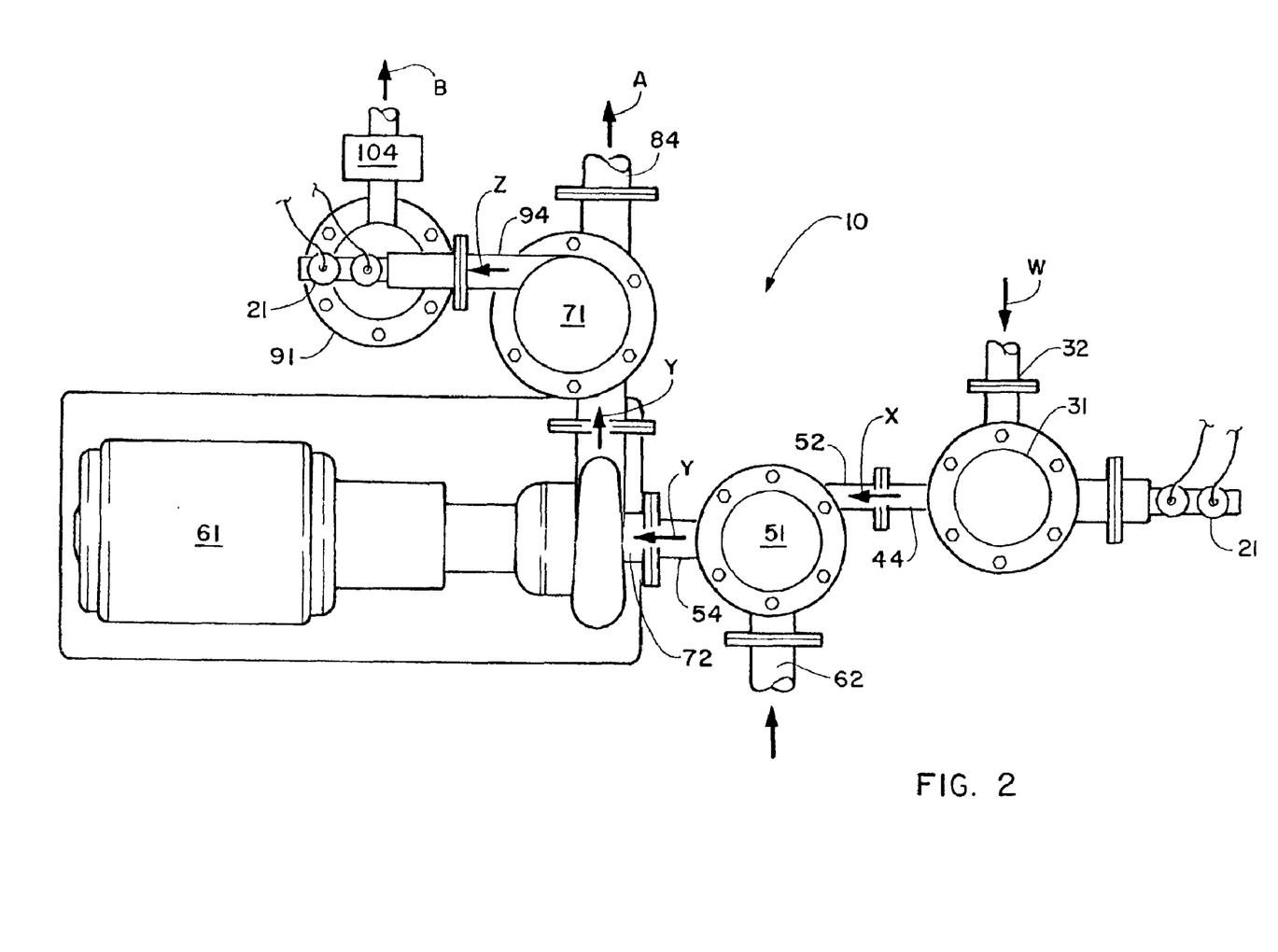
FIG. 2 is a top plan view of the system.
Figures 3, 4, 5:
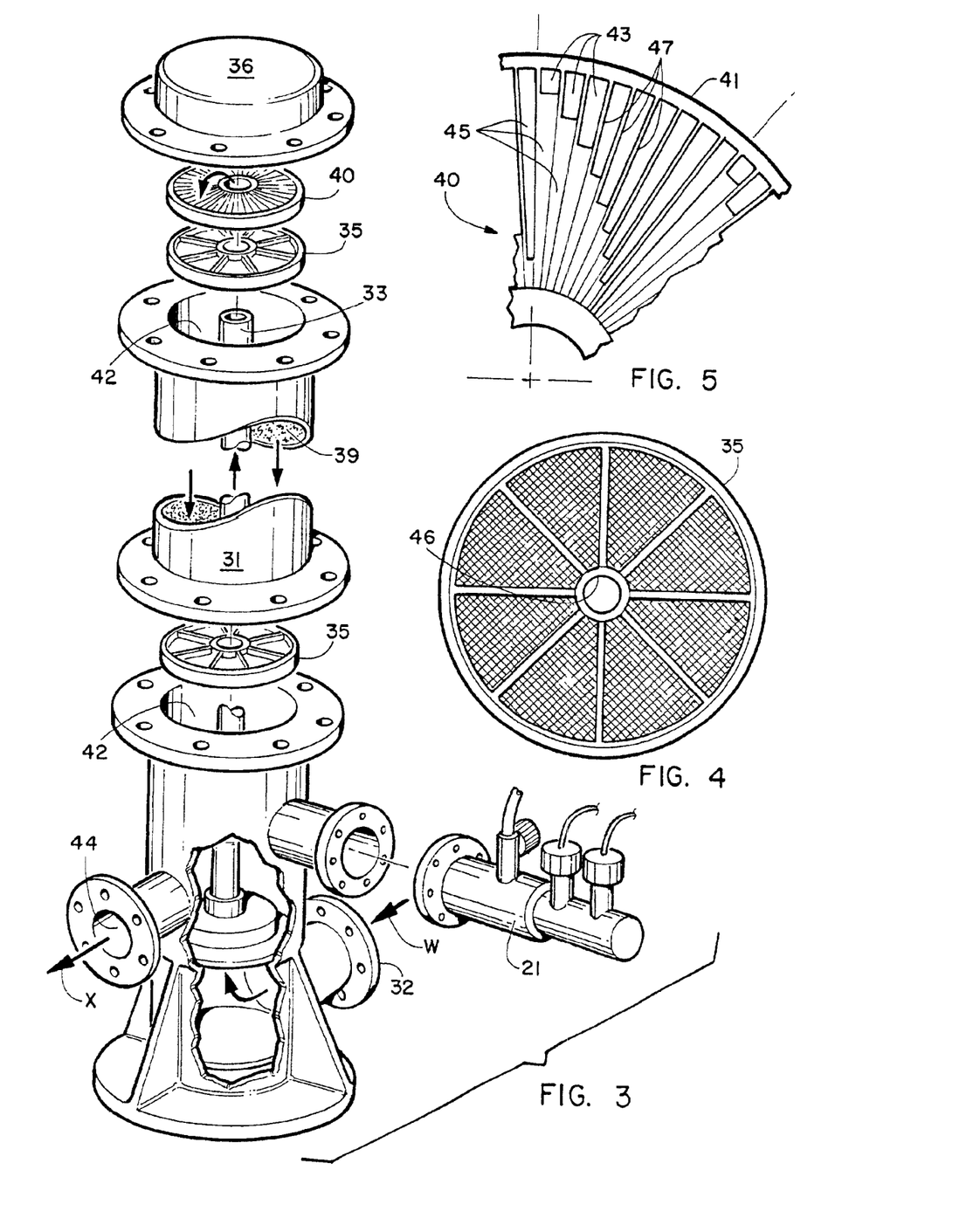
FIG. 3 is a exploded perspective view of the oxygen saturator.
FIG. 4 is detailed view of the file support screen of the holding assembly.
FIG. 5 is detailed view of one section of the flow distributor.

The pre-filtration water decontamination system and apparatus, as represented in FIGS. 1A&B and FIG. 2 by reference character 10, encompasses the water tank 11 and ozone generator 15 combinations, the oxygen saturator 31, the blender 51, the separator 71, and the recovery unit 91. Reference now should be made to FIGS. 3 through 5. As described above, high-pressure oxygenated ionized water saturated with dissolved ozone from a corona-discharge ozone generator 14 is injected under high pressure from the ionized water tank 11 into the oxygen saturator 31 through the saturator inlet port 32. The pressure (from about 80–150 psi; 120 psi optimum) forces this high-pressure water stream into the oxygen saturator up to the top through the saturator intake pipe 33 where a flow distributor 40 thereat evenly distributes the high-pressure water stream into the saturator chamber 42. Holding assemblies 35, near to the top and the bottom of the saturator chamber 42 securely hold suitable fill material 39 within the saturator chamber 42. The upper and lower holding assemblies hold the fill material 39 in place with mesh-like material therein to thereby permit the flow of the high-pressure water stream therethrough.

The high-pressure water stream percolates down through packed fill material 39 in an envelope of high-pressure air and out of the oxygen saturator through the saturator exit port 44. Conventional sensor assemblies 21 (such as ultrasonic level sensors) control the volume of the high-pressure water stream and the high-pressure air envelope. The sensor assembly 21 is in communication with the saturator chamber 42 and detects the water level and the air pressure therein. The sensor assembly 21 is generally located above the saturator exit port 44.

The sensor assembly 21 can be any conventional sensing unit suited for the intended purpose. Typical sensor assemblies include Model/Part Number LVU-152 distributed by Omega of Stamford, Conn., or its equivalent. Such sensor assemblies 21 are adapted to monitor various water levels and air pressure and based on the levels thereat and the location of the sensor assembly 21, to detect the need for air valves to open and/or close, to detect the need for water valves to open and/or close, and to detect the need for a water stream and/or air, as the case may be, to enter or to be discharged. Each sensor assembly 21 has a high-level sensor 22 with a probe 24 and a low-level sensor 23 with a probe 25 and may, but need not, have an air valve for the purpose of releasing excess or unwanted air and/or gases. The function of each sensor assembly, though similar, differs somewhat based on its location; i.e., whether associated with the oxygen saturator 31 or with the separator 71 (and recovery unit 91).

The high-pressure water stream becomes saturated with excess oxygen in this environment and under these conditions. When the air envelop 'shrinks' as it is adsorbed by ionized ozone-treated water cascading through the fill material 39, the sensor assembly 21 energizes a compressed-air line valve to replenish the high-pressure air adsorbed by the high-pressure water stream. The pressure maintained in the oxygen saturator should be between about 80–150 psi; with 120 psi being the optimal pressure for the best results.

The flow distributor 40 is a unique feature of the oxygen saturator 31. It is located adjacent to the top of the oxygen saturator 31 above the upper holding assembly 35. At its center is an aperture 46 for entry of the high-pressure water stream from the saturator intake pipe 33. Radiating from the center are a plurality of spokes or fingers 45 of varying lengths. These fingers 45 are basically flat surfaces having at the distal ends, a slot 43. One finger 45 and one slot 43 is a finger/slot set. The flow distributor 40 may have one or more finger/slot sets for a section 41. A wall or raised ridge 47 may, but need not be between each finger/slot set. I have found that between six to 14 such finger/slot sets will function well. In addition, the flow distributor 40 may have one or more sections 41 of such finger/slot sets. Good results are obtained with about four to 12 sections 41 bearing between about six to 14 finger/slot sets; although more or less of either (section or set) will also suffice. Best results are obtained with about eight sections bearing between about nine to 11 finger/slot sets.

Additionally, where each section 41 contains a plurality of finger/slot sets, for best flow distribution, I have found that the slot 43 of each succeeding finger 45 should be larger than the slot 43 of the previous finger 45 until the final slot 43 has no finger 45 or the finger 45 is merely a stub. In other words, the first finger 45 to a section 41 of a finger/slot set may have a small slot 43 (or slit) or none at all. The next finger 45 of a finger/slot set has a larger slot 43 and so on in the same direction. When the finger 45 of the last finger/slot set of a section 41 is a stub or none at all (approximately a near-full slot or a full slot), the next section 41 begins.

The functionality of the flow distributor 40 cannot be understated. With the relatively flat fingers 45 a water stream flows evenly over the flat fingers 45 and up to and out of the slot 43. The length of the slot 43 for each succeeding finger 45 becomes larger and larger. The water stream flows into the smallest distal slot 43 near to the outer perimeter of the saturator chamber 42 and incrementally, with the adjacent slots 43, nearer and near to the center; repeatedly for each succeeding flow section 41. A even distribution of the high-pressure water stream is fed into the saturator chamber 42 for a more efficient saturation effect. Conventional nozzles or jets will become plugged or clogged with various contaminants, such as, but not limited to slime, scale, and calcium. They will then require cleaning; this will take time resulting in down-time for the pre-filtration process. With the flow distributor 40 of the present invention, any build-up occurs on the flat surfaces of the fingers 45, and only at the drop-off edge of the slots 43. The water stream is relatively unimpeded and, over time, when an obstructing build-up does occur, maintenance is simple. The saturator cap 36 and flow distributor 40 are easily removed. The offending contaminants then may simply be scraped off, dissolved with acid or its equivalent, or replaced with a new flow distributor 40. In either event, disruption of use of the oxygen saturator 31, and effect on the entire system, is minimized.

After the high-pressure water stream (which includes high-pressure ionized ozone-treated water mixture) is fully oxygen-saturated (containing excess dissolved oxygen; approximately 50–90 mg/l) it exits the oxygen saturator 31 from the saturator exit port 44. This mixture stream, referred to as an HPOM stream, exits the oxygen saturator 31 at a high pressure as described above.

Reference is now made to FIGS. 2 and 6. As the HPOM stream is forced into the blender 51 through the blender inlet port 52, raw influent is brought into the blender 51 through the raw influent inlet port 62; at a significantly lower pressure than the pressure of the HPOM stream (preferably at zero to negative pressure). The effect is created by the disk suction pump 61 which draws the raw influent and the HPOM into the blender 51 as well as out of the blender 51. This disk suction pump 61 is a conventional vacuum pump such as Model/Part Number 215T CP3768T-4 402-12 provided by the DISCFLO Corporation of San Diego, Calif. or its equivalent. The positioning of the disk suction pump 61, as illustrated in FIG. 2, should be positioned between the blender exit port 54 and the separator inlet port 72 in order to draw raw influent and HPOM into and out of the blender 51.

The disk pump 61 is not like a centrifugal pump, positive displacement gear, or lobe pump. It is a boundary-layer viscous-drag vacuum pump that draws in the raw influent and in the process discharges the WWP stream from the blender 61 into the separator 71 at high velocity with minimum shear, and virtually no turbulence. The disk pump 61 has a series of parallel rotating smooth-surface disks to create a boundary layer viscous drag force that pulls the WWP stream through the pump housing without turbulence.

Other pumps use some type of impingement device, relying on force to push the water through the pump. Ordinary impeller pumps shear the polar bond of the microbubbles and the formed and forming clusters of particles (contaminants) and microbubbles. This causes the microbubbles to separate from the microscopic solid particles of the raw influent before they can be discharged to the separator. The non-impingement and laminar flow of the disk pump 61 is similar to the flow through an ordinary pipe. The layer of fluid at the disk surface is stationary (relative to the rotating disks), moving faster than the layers in the middle between the disks, creating a boundary layer drag effect. Viscous drag pulls the boundary layers into multiple smooth laminar flow streams. A micro-bubble's polar bond with the microscopic solid particles of the raw influent particles will separate if exposed to excessive pump shear forces. The smooth laminar flow feature prevents that from occurring and is essential to this process.

Additionally, disk pumps actually perform more efficiently when pumping algae-laden water. Water containing dense concentrations of algae will cling more readily to the disk surface, which increases disk pump flow rates. The variable speed controller for the motor 67, 68 of the disk pump is connected to an ultrasonic flow meter and a vacuum sensor 57, which automatically adjusts the speed of the motor 67 of the disk pump 61 to maintain a constant, pre-determined gallon-per-minute (GPM) flow rate, regardless of viscosity or turbidity of the stream being processed. As a result, the pre-filtration system of the present invention becomes more efficient and consumes less electrical energy during a rainstorm.

The viscous-drag of the smooth surfaces of the disk pump 61 form boundary layers, which draw raw influent into and through the blender 51. The raw influent, under negative to zero pressure, is drawn into the blender mixing chamber 60 through a plurality of radiating blender inlet slots 63 interspaced between blender inlet spokes 65. At the same time, the HPOM stream enters the blender mixing chamber 60, from the blender intake chamber 50, through a plurality of blender nozzles 53 located above, and in alignment with, the blender inlet slots 63. When the HPOM stream, saturated with excess dissolved oxygen, enters the mixing chamber 60 it immediately reacts to the substantially lower pressure therein by forming into a plurality of ionized micro-bubbles. This is a phenomenon known as white-water. The white-water immediately broadcasts throughout and blends with the raw influent turning the entire mixture opaque. This resultant white-water mixture stream is referred to herein as the white-water process (WWP) stream.

With regard to the white-water phenomenon, as the HPOM stream (which contains excess dissolved oxygen) is injected into a low-pressure environment, the excess dissolved oxygen immediately expands to form billions of "invisible" micro-bubbles (over 400 million microscopic air bubbles per gallon). The total surface area of the micro-bubbles within one-gallon of white-water is approximately 250,000 square feet. The oxygen inside the micro-bubbles refracts white on the color scale, giving the opaque raw influent a chalk-white appearance, which is why the result is called "white-water." The ratio of the HPOM stream, and its white-water, to that of raw influent to create a overall white-water effect (of the HPOM stream and raw influent) is about 10% to 15% HPOM stream to the raw influent.

Additionally, air bubbles in the range of a one-micron diameter (or smaller) have little buoyancy and will remain stationary unless external forces are applied to them. Microscopic solid particles (contaminants in the raw influent) also remain stationary in water and rarely collide with adjacent micro-bubbles unless there is a polar attraction. Micro-bubbles which do collide with other adjacent micro-bubbles form increasingly larger bubbles, which eventually become sufficiently buoyant to slowly rise to the surface (this is the process used for a tank-type DAF floatation system and is precisely why very large dissolved-air flotation tanks are required for its process).

If, however, the micro-bubbles are ionized (as in the system and apparatus of the present invention), hundreds of positively charged micro-bubbles will attach themselves to the negatively charged microscopic solid particles (contaminants) contained within the raw influent thereby coating the contaminants and creating numerous multi-micro-bubble combinations (containing the contaminants) in the process. These newly formed multi-micro-bubble combinations then collide with, and attach to, each other thereby forming increasingly larger clusters upon clusters of such combinations. These newly formed larger clusters become buoyant and will begin to rise slowly to the surface. As these larger clusters so rise they collide with, and attach to, other similar large clusters, thereby increasing in size and in buoyancy in the process. The attaching process repeats and repeats throughout the process and the buoyancy of the clusters increases with their size.

The plurality of blender inlet slots 63 are basically around the perimeter in the base or floor 58 of the blender mixing chamber 60. Each blender inlet slot 63 has a corresponding nozzle 53 located directly above each blender inlet slot 63. This facilitates mixing of the raw influent with the HPOM stream by causing the raw influent to pass directly up to each nozzle 53. Turbulence of mixing may be enhanced by adding dimples 55 on the inner surfaces of the wall of the blender 51. Increased mild turbulence cause more of a grouping or clustering effect.

The WWP stream fills the blender 51 quickly and discharges from the blender exit port 54 into the separator 71 (FIG. 7) by way of the separator inlet port 72 (preferably an angled or tangential port). The blender cap 66 maintains the WWP stream within the blender 51 and, thereby, forces the WWP stream out of the blender 51. The blender cap 66 is removable to facilitate maintenance of the blender 51 and its nozzles 53 and blender inlet slots 63 as needed. Since there are no moving parts, maintenance is minimal.

Figure 7:
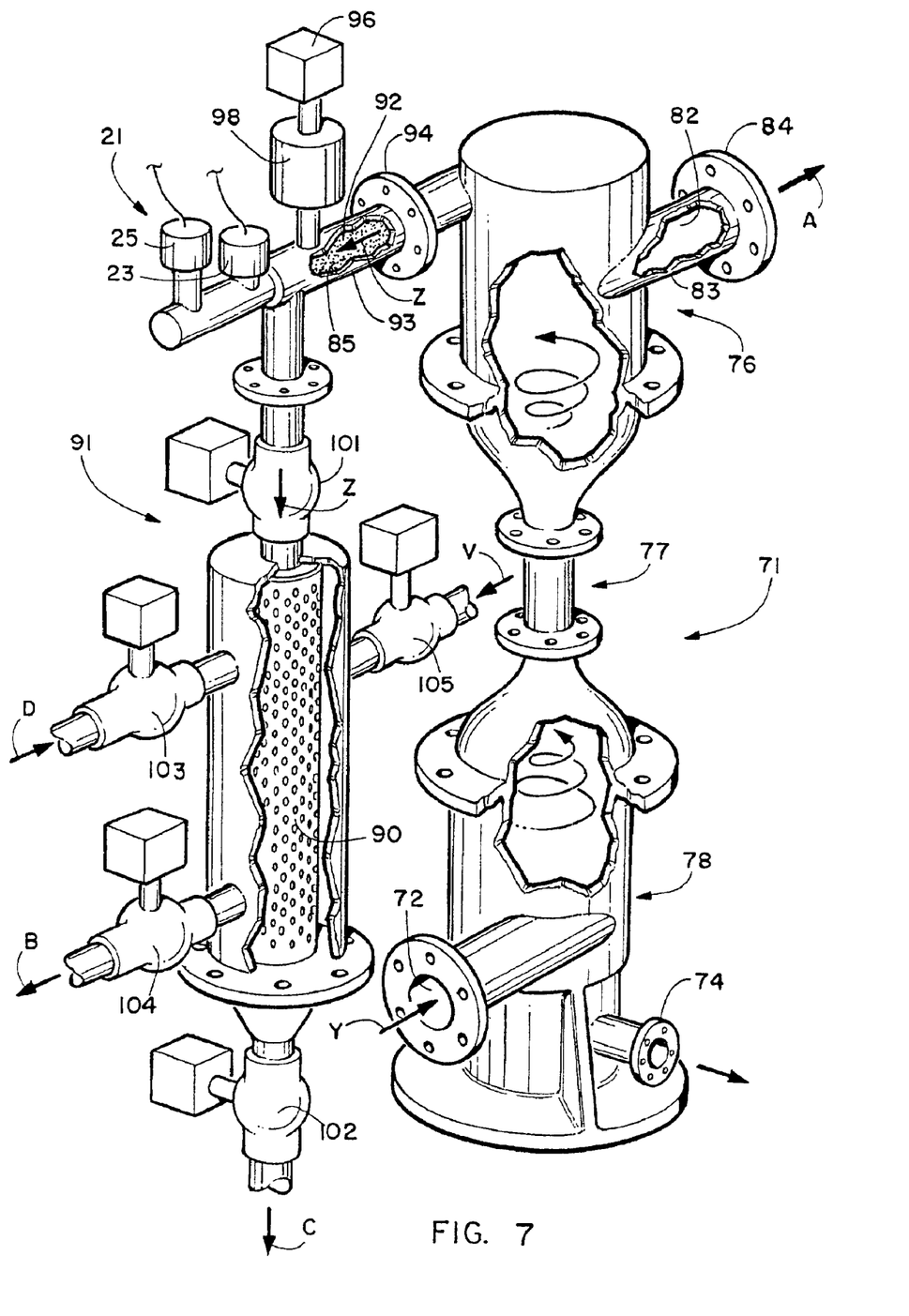
FIG. 7 detailed perspective and partially cut-away view of the separator and recovery unit combination.

The WWP stream enters the separator 71 from the blender exit port 54 via the separator inlet port 72. This separator inlet port 72 (preferably an angled or tangential port) located in the lower section 78 of the separator 71. The separator 71 basically consists of a lower section 78, a central section 77, and an upper section 76. It may be tubular but preferably is hour-glass shaped with the central section 77 narrower than the upper and lower sections 76, 78. The preferred embodiment is that of an hour-glass shape. It may be formed from a transparent material such as glass or an acrylic resin to permit observation of the flow therethrough.

By this configuration, an upward vortex column (or vortex column) is created and laminar viscous-drag separation is achieved in the process. In this regard, when the WWP stream (high-pressure water containing excess dissolved oxygen blended into the raw influent stream) is subjected to centrifugal forces inside a separator 71 of rapidly spinning water effected by the tangential angle of the separator inlet port 72, it causes the WWP stream to rotate and flow upward. As the spinning column of the WWP stream reaches the narrow central section 77 of the separator 71, the velocity of the vortex column markedly increases, creating a high-pressure zone at the outer perimeter of the separator 71 and a low-pressure zone in the center of the vortex column. The now buoyant micro-bubbles attached to the microscopic solid particles (as well as their forming and formed combinations and clusters) are forced into the center of the vortex column by the viscous drag of the laminar transfer process. This is caused as water molecules drag across the surface of the perimeter wall of the separator 71, they will tend to slow down and move at a slower pace than water molecules away from the surface wall. The next inner layer of molecules moves at a slightly faster rate. Each subsequent layer of water molecules moves even faster and causes or contributes to the diminishing viscous drag of each succeeding (or laminar) layer. This is called laminar flow, where the velocity of the water is slower at the perimeter and accelerates in the center of the separator resulting in the transfer process.

Unlike a large, deep flotation tank as in the prior art, the distance between the outer perimeter and the center of the vortex column in the separator 71 is relatively slight; as slight as several inches. In this environment, micro-bubble/particle clusters have a much shorter distance to travel (from perimeter to center) through the laminar layers of water molecules. Laminar drag forces accelerate the movement or transfer of the water molecules (micro-bubbles, clusters, and combinations) towards the center of the vortex column. The viscous drag between each layer of spinning water molecules inside the separator 71 causes the micro-bubbles therein to elongate. The difference in the viscous drag on each side of the elongated micro-bubble (and combinations) pulls micro-bubbles from one microscopic laminar layer toward the center to the next microscopic layer, until they reach the center of the vortex column.

The low pressure at the center of the vortex column causes the microscopic solid particles (contaminants) of the WWP stream to coalesce in the center as the waste water stream. The high pressure at the perimeter of the separator 71 attracts the WWP stream, as cleansed of the waste water stream, thereby creating a decontaminated water (DCW) stream. The DCW stream is carried up the separator 71 and is discharged therefrom via the water outlet 84 (preferably an angled or tangential port) for final-stage filtration. This outlet has an upper inner edge 82 and a lower inner edge 83.

The waste water stream is carried to the top of the separator 71 by the spinning low-pressure center of the vortex column where it begins to accumulate. As gases from the waste water also accumulate thereat forming an air pocket, the pressure from the gases forces the waste water level 85 to drop. A sensor assembly 21 (similar to the ultrasonic water level sensor previously described), which monitors and controls the waste water level, is attached in the upper section 76 of the separator 71. The waste water outlet 94 here has an top inner edge 92 and a bottom inner edge 93. When the waste water level 85 reaches the bottom inner edge 93 of the waste outlet 94, the actuator attached to the air relief valve 96 is energized to vent the excess accumulated gases through the carbon filter 98 and out of the system (as illustrated in FIG. 7). It must be understood, however, that the configuration may be reversed with the air relief valve 96 being proximal to the sensor assembly 21 and the carbon filter 98 being distal to the sensor assembly 21. The carbon filter 98 captures the volatile toxic chemical gases and volatile organic compounds which were striped from the contaminated raw influent by the micro-bubble clusters as the waste water stream was created. The air pocket expands and the waste water level 85 drops.

Prior art air stripping towers currently discharge toxic chemical gases and volatile organic compounds into the atmosphere. When the carbon filter 98 is fully saturated, it is easily replaced. This venting also causes the waste water level 85 to rise again up, or near, to the top inner edge 92 of the waste outlet 94. The action is repeated as necessary and prevents the waste water level 85 from contacting the upper inner edge 82 of the water outlet 84 which, should this occur, would deposit sludge or waste float thereat.

The recovery unit 91 additionally monitors and controls further disposition of the waste water stream. It has a plurality of valves 101, 102, 103, 104, and 105 which are activated to an open or closed position as needed. In the flushing mode, the waste water stream is periodically flushed into and through a sludge or waste filter 90. This is a conventional waste filter or screen adapted to separate solids from the waste water stream. For this mode, valve 101 (the main waste water valve) and the valve 104 (the filtered waste water valve) are opened—the waste filter 90 is positioned in between these two valves. The waste water stream passes through valve 101, into and through the sludge filter 90 for collecting the solids in the waste water stream, and out valve 104 returning this filtered or processed influent to the blender 51 for additional processing. When the sludge filter 90 is full, the recovery unit 91 initiates the recycle mode by closing valves 101 and 104 and opening valves 105 (the high-pressure air valve) and 102 (the waste hopper valve). High-pressure air (or any other suitable purging/cleansing liquid, material, or compound) enters the recovery unit 91 through valve 105 and flushes the collected waste sludge from the waste filter 90 and out valve 102 into a waste hopper 111. The sludge is held at the waste hopper 111 where it is processed for recycling or removal. Processing may be, but is not limited to, drying and packaging at pre-determined quantities.

After the waste filter 90 has been flushed of its accumulated sludge, valve 102 and 105 are closed. Periodic cleaning cycles back-flush the waste filter 90 cleansing it of remaining contaminants. In this regard, valve 103 (high-pressure water valve) and valve 104 are opened. High-pressure water (or any other suitable purging/cleansing liquid, material, or compound) from valve 103 passes into (direction arrow V) and through the waste filter 90 cleaning it of most, if not all, of any remaining waste particulants therein. The now contaminated high-pressure water passes through valve 104 and to the blender 51 for processing. The waste sludge is collected in a hopper for removal and disposal. Algae that is free of other contaminants is removed from the waste filter 90 can be packaged and sold as an animal feed supplement or fertilizer.

At this point, the water generally has had nearly all contaminants removed and can be passed to a conventional water plant filtration system via output pipe to remove any remaining particles. This pre-filtration process removes between 80.099.999% (5-log) of the suspended solids from the treatment plant process water flow; most regularly, such removal normally ranges above 99.99% (4-log). Also, substantially all algae is removed. This is sufficient to meet present US EPA Clean Water Act regulations for a minimum 85% removal of suspended solids.

The operation, by volume and time, of the system described herein, under the examples set forth below, not as limitations to the present invention, would be as follows. Where the total volume of space between the upper ultrasonic-sensor and the lower ultrasonic-sensor inside the top of the separator column is 105.7 in.$^3$, or 0.454 gallons of fluid wastewater; and where the volume of expanded oxygen adsorbed by the oxygen saturator 31 as dissolved oxygen adsorption of 80 mg/l (ppm) of excess dissolved oxygen at 120 PSI in a 10 GPM high-pressure fluid stream would be equal to 105.7 in.$^3$ when fully expanded as one-micron sized white water micro-bubbles of white water inside the negative pressure of the blender 51 created by the vacuum disk pump 61. Therefore, under this setting, by way of example only, not by way of limitation, the total volume of air accumulating in the space between the lower 23 and upper 22 ultrasonic sensors at the top of the separator 71 per minute must be vented approximately once every minute. A 100-GPM flow rate and positive pressure inside the separator 71 will purge the 105.7 in.$^3$ of accumulated air in approximately less than 1.5 seconds through the air relief valve 96. A higher system head loss will increase the air-purging rate. As to the rate of waste water (i.e., buoyant suspended solids) accumulating at the top of the separator 71, a total of 400 mg/l (ppm) as algae and/or other buoyant suspended solids in the raw influent stream would be equal to about 0.04 gallons per minute. To fill half of the 105.7 in.$^3$ volume (half of the 0.454 gallons) with suspended solids in the waste water collection area of the separator 71 (i.e., the waste water level 85), it would take approximately 5.675 minutes, or five minutes and 41 seconds. Assuming a waste water discharge rate of 20 GPM, the main waste water valve 101 and the filtered waste water valve 104 would be opened for approximately 1.4 seconds every 5 minutes to purge the waste water collection area 85 at the top of the separator 71.

Also by way of example only, not by way of limitation, a 400 mg/l (ppm) concentration of buoyant suspended solids in a 100 GPM raw influent stream flow would be equal to approximately 0.2 pounds of suspended solid waste every hour, or 0.0267 ft.$^3$ of waste material per hour, or 46.14 cubic inches. Using a waste filter 90 with and 3.5 inch inside diameter by 16 inches high, the volume inside half of such filter would be approximately 76.97 cubic inches. Given the flow described above, this filter would become half full within approximately 36 minutes. As described herein, the various modes and cycles of the recovery unit 91 include: venting accumulated air in the top of the separator 71; discharging accumulated waste water from the top the separator 71 into the recovery unit 91 and through the waste filter 90; forcing the accumulated solid waste collected in the waste filter 90 therefrom and into the sludge hopper 111; and, cleaning the waste filter 90. Under these general conditions, the system nodes would direct the following: the air relief valve in the top of the separator 71 will open for 1.5 seconds every minute; the recovery unit 91 will purge a volume of fluid equal to twice the amount of accumulated buoyant suspended solids from the top of the separator 71 approximately every five minutes, purging for about 1.4 seconds; the solid waste collected in the waste filter 90 generally would be emptied approximately every 36 minutes into the waste hopper 111; and the waste filter 90 would be cleaned (back flushed) once approximately every 24 hours, flushing for about one minute. All of the waste water is recovered and recycled.

The above example reflects only that based on contaminant concentrations, volumes, and desired results. The results can easily be varied by the software based on the contaminant concentrations and types, and volumes being received or desired.

It must also be understood that the apparatus and its components parts may be constructed of any material suited for the intended purpose. Preferably from materials approved and acceptable for potable water by the National Sanitation Foundation (NSF). Such materials included, but are not limited to, plastics, machined metal, cast metal, or the equivalents, or any combinations thereof.

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention. Accordingly, the scope of the invention should be determined not by the embodiment[s] illustrated, but by the appended claims and their legal equivalents.

The invention claimed is:

1. A method of removing contaminants from influent water which comprises the steps of:
    (a) directing oxygenated ozone-treated water into an air saturator;
    (b) directing air at a pressure of between about 80 psi to about 150 psi into said air saturator to saturate said oxygenated ozone-treated water thereby creating a high-pressure oxygenated ozone-treated water mixture;
    (c) directing said high-pressure oxygenated ozone-treated water mixture to a blender;
    (d) at a pressure substantially lower than the pressure of said high-pressure oxygenated ozone-treated water mixture, directing influent water containing at least some contaminants to said blender;
    (e) mixing said high-pressure oxygenated ozone-treated water mixture and said influent water thereby creating a plurality of micro-bubbles and entraining particles in a resulting white-water mixture;
    (f) directing said white-water mixture to a separator;
    (g) effecting said directing of steps (c), (d), and (f) by a suction pump attached between an outlet port of said blender and an inlet port of said separator;
    (h) causing said white-water mixture to rotate about an axis in said separator so that waste water, with entrained contaminants, is separated from said white-water mixture by coalescing along said axis, and decontaminated water separated from said white-water mixture away from said axis and from said waste water;
    (i) removing said waste water; and
    (j) removing said decontaminated water.

2. The method according to claim 1 wherein said mixing is increased by causing turbulent flow over dimples in walls of said blender.

3. The method according to claim 1 further including regulating pressure of water passing from said air saturator to said blender at a predetermined level at between about 80 psi to about 150 psi.

4. The method according to claim 3 wherein said pressure is regulated to approximately 120 psi.

5. The method according to claim 1 further comprises collecting heavy particles at a lower end of said separator.

6. The method according to claim 1 further comprises removing air bubbles and buoyant particles from a predetermined location at about an upper end of said separator.

7. The method according to claim 6 further comprises removing air and any gases present from an upper end of said separator above said predetermined location.

8. The method according to claim 7 further comprises filtering toxins from said any gases present.

9. The method according to claim 1 further comprises filtering and reclaiming said waste water for additional treatment.

10. The method according to claim 9 further comprises returning filtered waste water to said blender.

11. The method according to claim 9 further comprises capturing recyclable waste in a filter and removing said recyclable waste for recycling.

12. The method according to claim 11 further comprises cleaning said filter and directing a resultant product to said blender.

13. A method of removing contaminants from influent water which comprises the steps of:
    (a) directing oxygenated ozone-treated water into an air saturator;
    (b) directing air at a pressure of between about 80 psi to about 150 psi into said air saturator to saturate said oxygenated ozone-treated water thereby creating a high-pressure oxygenated ozone-treated water mixture;
    (c) directing said high-pressure oxygenated ozone-treated water mixture, through a plurality of nozzles to a blender mixing chamber;
    (d) at a pressure substantially lower than the pressure of said high-pressure oxygenated ozone-treated water mixture, directing influent water containing at least some contaminants, through a plurality of slots to said blender mixing chamber, said nozzles located above and in alignment with said slots;
    (e) mixing said high-pressure oxygenated ozone-treated water mixture and said influent water in said mixing chamber thereby creating a plurality of micro-bubbles and entraining particles in a resulting white-water mixture;
    (f) directing said white-water mixture to a separator;
    (g) causing said white-water mixture to rotate about an axis in said separator so that waste water, with entrained contaminants, is separated from said white-water mixture by coalescing along said axis, and decontaminated water separated from said white-water mixture away from said axis and from said waste water;
    (h) removing said waste water; and
    (i) removing said decontaminated water.

14. The method according to claim 13 further comprises effecting said directing of steps (c), (d), and (f) by a suction device attached between an outlet port of said blender and an inlet port of said separator.

15. The method according to claim 13 wherein said mixing is increased by causing turbulent flow over dimples in walls of said blender.

16. The method according to claim 13 further including regulating pressure of water passing from said air saturator to said blender at a predetermined level at between about 80 psi to about 150 psi.

17. The method according to claim 16 wherein said pressure is regulated to approximately 120 psi.

18. The method according to claim 13 further comprises collecting heavy particles at a lower end of said separator.

19. The method according to claim 13 further comprises removing air bubbles and buoyant particles from a predetermined location at about an upper end of said separator.

20. The method according to claim 19 further comprises removing air and any gases present from an upper end of said separator above said predetermined location.

21. The method according to claim 20 further comprises filtering toxins from said any gases present.

22. The method according to claim 13 further comprises filtering and reclaiming said waste water for additional treatment.

23. The method according to claim 22 further comprises returning filtered waste water to said blender.

24. The method according to claim 22 further comprises capturing recyclable waste in a filter and removing said recyclable waste for recycling.

25. The method according to claim 24 further comprises cleaning said filter and directing a resultant product to said blender.

* * * * *